H. GRAY.
Centering Devices for Lathes.

No. 142,014.  Patented August 19, 1873.

Witnesses
M. W. Osborne
Miles L. Peck

Inventor.
Harvey Gray.
By James Shepard Atty.

UNITED STATES PATENT OFFICE.

HARVEY GRAY, OF BRISTOL, CONNECTICUT, ASSIGNOR TO NATIONAL WATER-WHEEL COMPANY, OF SAME PLACE.

IMPROVEMENT IN CENTERING DEVICES FOR LATHES.

Specification forming part of Letters Patent No. 142,014, dated August 19, 1873; application filed March 17, 1873.

*To all whom it may concern:*

Be it known that I, HARVEY GRAY, of Bristol, in the county of Hartford and State of Connecticut, have invented a new and Improved Device for Truing Work upon the Face-Plates of Lathes, of which the following is a specification:

In the use of my device, I first fasten the work upon the face-plate by means of any suitable clamping devices, leaving the clamps sufficiently loose so that by pressure the work can be moved thereon, but tight enough to retain the work in place when left to itself. In the ordinary tool-rest and carriage I secure a roller-tool, and by means of the screw which feeds said carriage the roller is forced slowly up against the work on the face-plate while the work and face-plate revolve, when the roller will, at each revolution of the plate, gradually throw the work toward the center until it is properly trued up.

Figure 1:
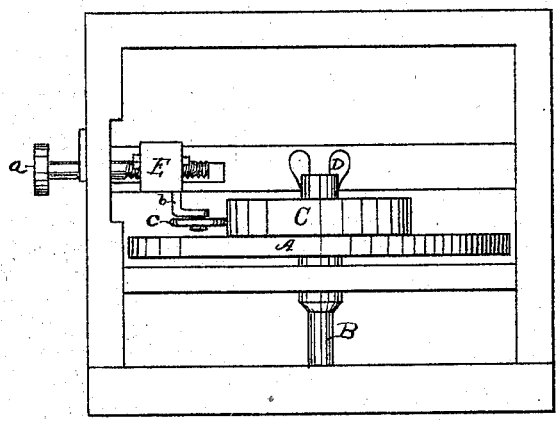
Figure 2:
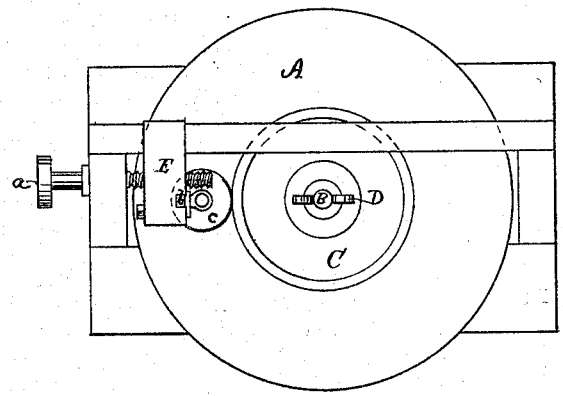

In the accompanying drawings, Figure 1 is a front elevation of devices which embody my invention; and Fig. 2 is a plan or top view of the same, the top part of the frame being removed in order to better show the other parts.

In the drawing, the face-plate A is horizontal, and is secured to a vertical shaft, B, which may be driven by any of the ordinary means, and which it is considered unnecessary to show.

Although my improvement is specially adapted for heavy work and to the above-described style of lathe, it may be practiced with advantage upon a lathe having a horizontal shaft and vertical face-plate.

C designates the work to be trued up for turning, and it is held upon the face-plate A by the clamping device D. Various patterns of work will require different clamping devices; therefore, any of the ordinary clamps may be employed, as occasion requires. E designates an adjustable tool-carriage, which is moved at right angles to the vertical shaft B by means of the screw $a$. In the tool-carriage E I insert the tool $b$, which consists of a shank (like the shank of all the tools which fit into the tool-carriage) and a roller, $c$, the axis of which roller is parallel to that of the face-plate A and of the shaft B. I place the work C upon the face-plate A and bring it somewhere near the center, when I partially fasten it by the clamping device D—that is, I clamp it so hard that it will not work out of place by its own weight or by the motion of the lathe, and so easy that it can be moved on the face-plate by applying sidewise pressure. The face-plate and lathe are then put in motion, and the carriage E, carrying the roller-tool $b$ $c$, is forced slowly toward the work. That portion of the work C which describes the largest circle while revolving in the lathe will soon meet the edge of the roller $c$, which roller will force the work toward the center of the face-plate A. The roller is forced in farther, and at each revolution the work is brought nearer central until it is properly trued, when it can be firmly clamped in its position for turning. In case a portion of the work has been previously turned, (as is often the case with large work,) the roller $c$ should be brought to bear against said turned portion, when the work may be centered perfectly true, and if the work is rough and not in a perfect circle it will bring the work as true as such work can be centered. Of course care must be taken not to bring the roller $c$ so far toward the work as to throw it out of true. By stopping the roller $c$ and withdrawing it so soon as it bears against the whole periphery of turned work, or nearly the whole periphery of rough work, there will be but little danger of moving the roller too far inward.

The roller $c$ may be so set as to bear upon the inside of a rim or ring, and true it by forcing the roller outward whenever it is desired to true up the inside of a piece of work instead of its outer edge.

When the work is properly trued and tightly clamped the roller-tool $b$ $c$ is removed and the ordinary cutting-tool inserted in its place, the lathe being in all its parts like any of the ordinary lathes now in common use. Ordinarily, work of this class is trued up by rapping it sidewise with a hammer, which is a slow, uncertain, and tedious process.

I claim as my invention—

The centering roller-tool $b$ $c$, in combination with the tool-carriage and its feed-screw, and adapted for operating upon the loosely-clamped work for bringing the work central upon the face-plate of the lathe, all substantially as and for the purpose described.

HARVEY GRAY.

Witnesses:
CHARLES C. SLATE,
JAMES E. LADD.